United States Patent Office 3,081,299
Patented Mar. 12, 1963

3,081,299
NOVEL 5,9-CYCLO-1,11-OXIDOSTEROIDS AND
METHODS FOR THEIR MANUFACTURE
Cecil H. Robinson, Cedar Grove, and Eugene P. Oliveto,
Glen Ridge, N.J., assignors to Schering Corporation,
Bloomfield, N.J., a corporation of New Jersey
No Drawing. Filed Feb. 2, 1961, Ser. No. 86,581
9 Claims. (Cl. 260—239.55)

This invention broadly relates to a novel group of compounds of the androstane and pregnane series and to methods for their manufacture. More particularly the invention relates to androstanes and pregnanes which have the 5 and 9 carbon atoms joined together so as to form as intra nuclear ring and also have their 1 and 11 carbon atoms joined together through an oxygen linkage to form an extra nuclear oxygen bridge thereby.

The novel compounds of our invention may be represented by the following general formula:

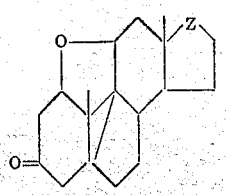

wherein Z is a member of the group consisting of

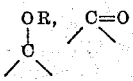

and

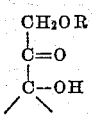

with R being a member of the group consisting of H and lower alkanoyl.

Our novel compounds are prepared by subjecting 11β-formoxy (or acetoxy)-Δ¹-5,9-cyclosteroids of the type disclosed in copending application S.N. 86,580, filed February 2, 1961, to the action of a deacetylating bacteria preferably *Flavobacterium dehydrogenans* to form a ring structure on the steroid as illustrated by the following general reaction scheme:

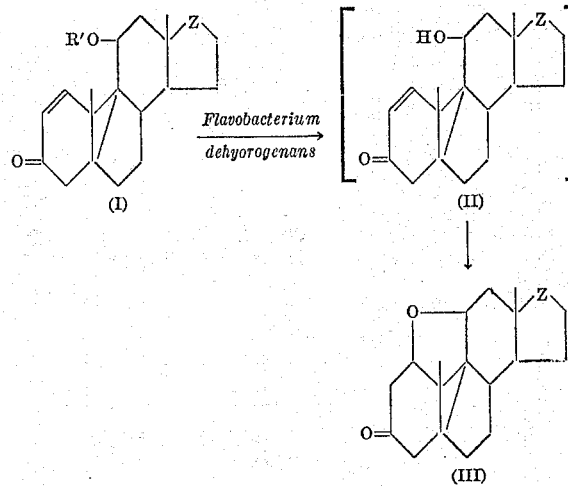

In the above reaction Z is as indicated above and R' represents HCO or CH₃CO. Intermediate structure II is less stable than the cyclized structure III (which is its isomer) and thus cannot be isolated.

Alternatively, a Δ¹,⁴-9α-halo-11β-hydroxy-pregnadiene or androstadiene is reduced with chromous chloride to form the novel compounds of the invention in the following general reaction scheme:

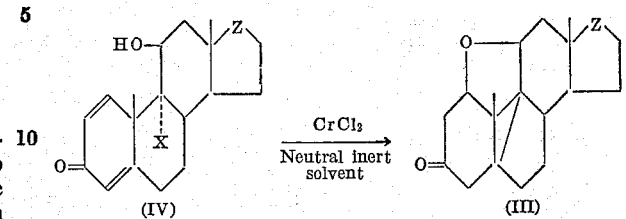

In the above reaction Z is as indicated above, X represents bromine or iodine and R represents a member of the group consisting of H and lower alkanoyl. The neutral inert solvents employed in the above reaction are preferably ketones such as acetone or methyl ethyl ketone or cyclic ethers such as dioxane and the like.

The above 5,9-cyclo-1,11-oxidosteroids (III) of this invention wherein Z is a cortical side chain, in addition to their use as valuable intermediates, exhibit anti-inflammatory activity of their own. For instance, the compound 5,9-cyclo-1,11-oxidopregnane-17α,21-diol-3,20-dione has activity equal to or better than hydrocortisone when administered topically. Their use as intermediates for preparing 2-alkyl-steroids such as 2-alkyl-5α-dihydrotestosterone is illustrated by the following general reaction wherein the androstane member is shown. The substituent R'' represents a lower alkyl group.

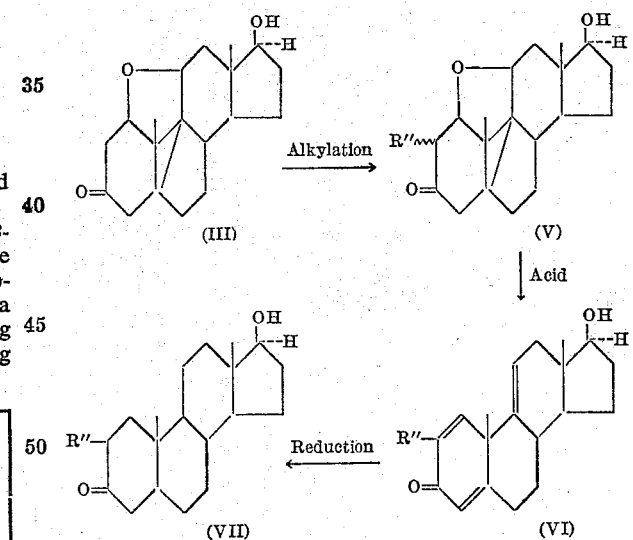

The above reaction sequence involves the use of the 5,9-cyclo-1,11-oxidosteroids (III) of this invention as starting materials for preparing the known, useful intermediate (VII) involving the alkylation procedures of Bernstein et al., J.A.C.S., 81, 1696 (1959). This method involves treatment of (III) with ethyl oxalate and sodium methoxide in tertiary butyl alcohol to form a sodium enolate (not shown). Methylation of the enolate with methyl iodide in acetone containing potassium carbonate gives the 2-methyl-2-ethoxalyl compound (not shown) which undergoes cleavage of the 1,3-diketone system upon treating with sodium methoxide in methanol to yield the 2α (or β)-alkyl-5,9-cyclo-1,11-oxidosteroid (V). This compound upon treatment with a suitable acid such as HCl will form the novel intermediate Δ¹,⁴,⁹⁽¹¹⁾-2-alkyl-testosterone (VI) which by acetylation, reduction with H₂ in the presence of a platinum catalyst, and hydrolysis gives the 2-alkyl-5α-dihydro-testosterone (VII).

In a similar manner, a 5,9-cyclo-1,11-oxidosteroid bearing acortical side chain can be employed as a useful intermediate in the synthesis of 2-alkylcorticosteroids as illustrated by the following general reaction scheme: (the bond "⌇" where it occurs represents either an alpha or beta linked substituent)

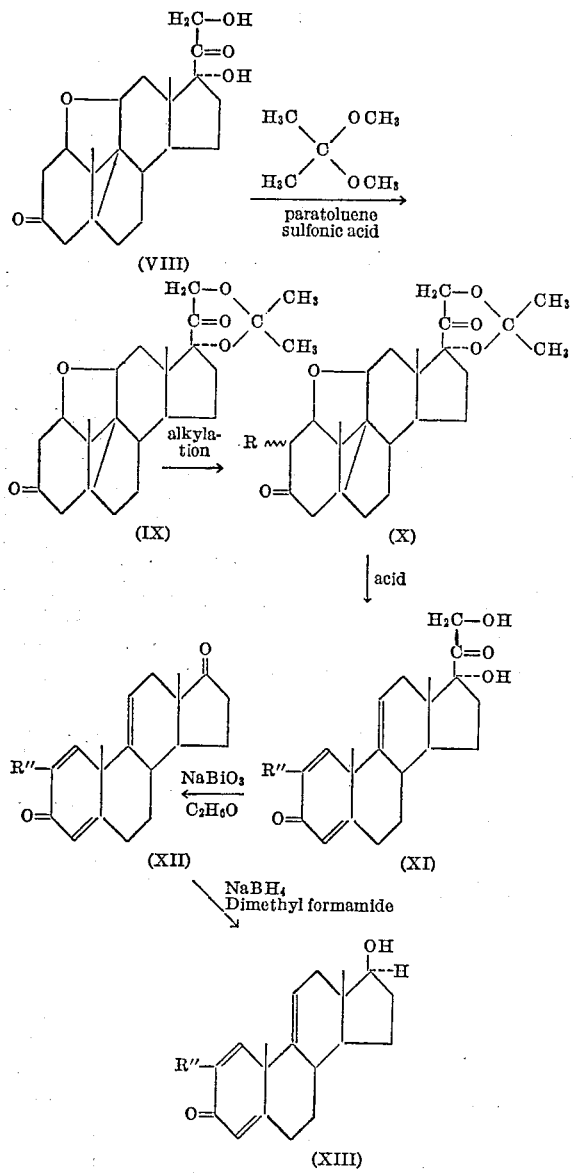

In this procedure the cortical side chain must be protected by a grouping such as the 17,20:20,21-bismethylene-dioxy group or a 17,21-acetonide group (as shown) in order that it may survive the strongly basic conditions of the alkylation step. The 5,9-cyclo-1,11-oxidopregnane-17α,21-diol-3,20-dione (VIII) is treated with acetone dimethyl ketal and para-toluene sulfonic acid to obtain the 17,21-acetonide (IX) which is then alkylated at the 2 position by the method of Bernstein et al. referred to above to yield the 2-alkyl-17,21-acetonide (X). This latter compound when treated with an acid such as HCl will give the intermediate 2-alkyl-$\Delta^{1,4,9,(11)}$-pregnatriene-17α,21-diol-3,20-dione (XI) which upon treatment with sodium bismuthate in acetic acid gives 2-alkyl-$\Delta^{1,4,9(11)}$-androstatriene-3,17-dione (XII) which can be treated with sodium borohydride in dimethyl formamide to yield the 2-alkyl-substituted-$\Delta^{1,4,9(11)}$-androstatriene-17β-ol-3-one (XIII) which may be transformed into 2-alkyl-5α-dihydrotosterone by conventional acetylation, reduction and hydrolysis.

The following examples will more particularly illustrate our invention and the novel intermediates derived from its use. It is of course understood that they are merely typical manifestations thereof and are not intended to limit its scope in any manner. For a proper definition of the scope of the invention reference may be had only to the appended claims.

EXAMPLE 1

5,9-Cyclo-1,11-Oxidopregnane-17α,21-Diol-3,20-Dione

Flavobacterium dehydrogenans is grown in a 1% Difco yeast buffered solution (10 g. of Difco yeast, 4.68 g. of $Na_2HPO_4.7H_2O$ and 4.48 g. of $KH_2PO_4$ per liter) with shaking and light for 22 hours, at 26–28° C. Three grams of 5,9-cyclo-1-pregnene-11β, 17α21-triol-3,20-dione 11β, 21-diacetate are then added in 80% ethanol (2 liters) and transformation is allowed to proceed for 72 hours with shaking and light. Extraction with chloroform and evaporation of the extract yields the crude product, which is then chromatographed on a Chromosorb W partition column, using the toluene-propylene glycol system and 300 g. of Chromosorb W. The fractions containing the desired product are combined and crystallized from ether-acetone-hexane to give the compound of this example, M.P. 200–206°, $[\alpha]_D$ —14°. No selective ultraviolet absorption between 220 and 350 mµ, is noted.

EXAMPLE 2

5,9 - Cyclo - 1,11 - Oxidopregnane - 17α,21 - Diol - 3,20-Dione from 9α-Bromo-1,4-Pregnadiene-11β,17α,21-Triol-3,20-Dione 21-Acetate (A) To a stirred solution of 9α-bromo-1,4-pregnadiene-11β,17α,21-triol-3,20-dione 21-acetate (1.0 g.) in acetone (100 ml.), at room temperature, is added chromous chloride solution (10 ml.; prepared according to the procedure of Djerassi et al., J. Am. Chem. Soc., 72, 4077 (1950)). An atmosphere of carbon dioxide is maintained in the reaction vessel during the whole time of reaction. The reaction mixture is left at room temperature for 5 minutes and another portion of chromous chloride solution is added. Ten minutes after the second addition of chromous chloride, a third portion of chromous chloride solution (10 ml.) is added, and the reaction mixture is left at room temperature for 30 minutes. The reaction mixture is then diluted with water and is extracted with ether. The ethereal extract is washed with water, dried ($Na_2SO_4$) and evaporated to give an oily residue which is chromatographed on a Chromosorb W partition column, using the propylene glycol-toluene system and 150 g. of Chromosorb W. The first fractions contain the desired product, and these fractions are combined and crystallized from acetone-hexane to give 5,9-cyclo-1,11-oxidopregnane-17α,21-diol-3,20-dione 21-acetate, M.P. 177°, no selective ultraviolet absorption between 220 and 350 mµ.

(B) The compound of part A of this example (100 mg.) is dissolved in methanol (20 ml.) and nitrogen is then bubbled through the solution for 10 minutes. Sodium methoxide (15 g.) is then added and the solution is left at room temperature, under nitrogen for 10 minutes. The reaction mixture is then neutralized with acetic acid, diluted with water and filtered. The residue is washed with water, dried and crystallized from acetone-hexane to give 5,9-cyclo-1,11-oxidopregnane-17α,21-diol-3,20 dione (the compound of Example 1).

EXAMPLE 3

9α-Bromo-1,4-Androstadiene-11β,17β-Diol-3-One 17β-Propionate

To a cooled (0°–5°) stirred solution of 1,4,9(11)-androstatriene-17β-ol-3-one 17β-propionate (4.7 g.) in tetrahydrofuran (200 ml.) and water (65 ml.) is added solid N-bromoacetamide (6.5 g.) followed by N-aqueous perchloric acid (65 ml.) added dropwise. The reaction mixture is stirred for 20 hours at room temperature, and is then treated with sodium sulphite, diluted with water and extracted with methylene chloride. The organic extract is washed with 5% sodium bicarbonate solution, then with water, and is dried (Na$_2$SO$_4$) and evaporated to dryness in vacuo. The residue is crystallized from acetone-hexane to give the compound of this example, which is a valuable intermediate in the preparation of the compounds of this invention.

EXAMPLE 4

5,9-Cyclo-1,11-Oxidoandrostan-17β-ol-3-One 17β-Propionate

A solution of 9α-bromo-1,4-androstadiene-11β,17β-diol-3-one 17β-propionate (1.0 g.), prepared according to the preceding example, in acetone (100 ml.) is treated with chromous chloride solution (in three 10 ml. portions) following the procedure of Example 2. The crude product is subjected to partition chromatography, using the ligroin-propylene glycol system and Chromosorb "W," and the early fractions are combined and crystallized from ether-pentane to give the compound of this example.

Alternatively 5,9 - cyclo - 1 - androstene - 11β,17β-diol-3-one 11β-acetate 17β-propionate is subjected to the action of *Flavobacterium dehydrogenans* according to the procedure of Example 1, and the product is chromatographed on a partition column (Chromosorb W) using the ligroin-propylene glycol system. The fractions containing the desired product are combined on the basis of similarity based on chromatographic analysis and crystallized from ether-pentane to give the compound of this example.

EXAMPLE 5

2-Methyl-5,9-Cyclo-1,11-Oxidoandrostan-17β-ol-3-One (A) To a solution of 5,9-cyclo-1,11-oxidoandrostan-17β-ol-3-one 17-propionate (3-57 g.) in tertiary butanol (50 ml.) is added sodium methoxide (1.2 g.) and to this mixture, under nitrogen, is added with stirring diethyloxalate (1.46 g.; 1 equiv.) and the mixture is stirred under nitrogen for 6 hours. Ether is then added and the mixture is filtered to give the crude sodium enolate of 2-ethoxalyl-5,9-cyclo-1,11-oxidoandrostan-17β-ol-3-one.

(B) The sodium enolate from part A of this example is added to a refluxing mixture of methyl iodide (25 ml.) and potassium carbonate (6.5 g.) in acetone (100 ml.) and reflux is continued for 18 hours. The hot reaction mixture is filtered, and the filtrate is concentrated in vacuo to low volume and is then diluted with water and extracted with ethyl acetate. The organic extract is washed with water, dried (Na$_2$SO$_4$) and evaporated to give a residue of crude 2-methyl-2-ethoxalyl-5,9-cyclo-1,11-oxidoandrostan-17β-ol-3-one.

(C) The crude product of part (B) of this example is dissolved in methanol (100 ml.) containing sodium methoxide (0.6 g.) and the mixture is left at room temperature for 4 hours. Water (10 ml.) and a few drops of acetic acid are then added, and the solution is concentrated in vacuo at room temperature. Water is then added, and the mixture is extracted with ethyl acetate. The organic extract is washed with water, dried (Na$_2$SO$_4$) and evaporated to give a residue consisting substantially of 2 - methyl - 5,9 - cyclo - 1,11 - oxidoandrostan - 17β-ol-3-one.

EXAMPLE 6

2-Methyl-1,4,9(11)-Androstatrien-17β-ol-3-One

A stream of dry hydrogen chloride is bubbled through a stirred solution of 2-methyl-5,9-cyclo-1,11-oxidoandrostan-17β-ol-3-one (500 mg.) in chloroform (100 ml.) at room temperature, for 30 minutes. The solution is then evaporated in vacuo to a residue which is crystallized several times from acetone-hexane to give the compound of this example.

EXAMPLE 7

2-Methyl-5α-Androstan-17β-Ol-3-One (2-Methyl-4,5-Dihydrotestosterone) From 2-Methyl-1,4,9(11)-Androstatriene-17β-Ol-3-One (A) The compound of Example 6 (1.0 g.) is dissolved in pyridine (5 ml.) and acetic anhydride (1 ml.) and the solution is kept at room temperature for 18 hours. The reaction mixture is then poured into water and filtered, and the residue is washed with water, dried and crystallized from acetone-hexane to give 2-methyl-1,4,9(11)-androstratriene-17β-ol-3-one 17β-acetate.

(B) The product of part A of this example (500 mg.) is dissolved in glacial acetic acid (100 ml.) containing pre-reduced platinum oxide catalyst (500 mg.) and is hydrogenated until the uptake of hydrogen is about three moles of hydrogen per mole of steroid. The mixture is then filtered, and to the filtrate is added chromium trioxide (100 mg.) in order to re-oxidize any partially reduced 3-ketone. After 4 hours at room temperature the mixture is treated with methanol (0.05 ml.) and is then diluted with water and filtered. The residue is washed with water and dried, and is then dissolved in 10% methanolic potassium hydroxide solution. The solution is refluxed for 30 minutes, cooled, neutralized with acetic acid, diluted with water and extracted with ether. The ethereal extract is washed with water, dried (Na$_2$SO$_4$) and evaporated to a residue which is chromatographed on a Chromosorb W partition column using the propylene glycol-toluene system. Fractions containing the desired product are combined on the basis of paper chromatographic analysis and are crystallized from acetone-hexane to give 2-methyl-5α-androstan-17β-ol-3-one.

EXAMPLE 8

5,9-Cyclo-1,11-Oxidopregnane-17α,21-Diol-3,20-Dione 17α,21-Acetonide

To a suspension of 5,9-cyclo-1,11-oxidopregnane-17α,21-diol-3,20-dione (1.0 g.) in 2,2-dimethoxypropane (15 ml.) and dimethylformamide (5 ml.) is added para toluene sulphonic acid monohydrate (20 mg.) and the mixture is refluxed until an aliquot shows a negative triphenyltetrazolium chloride test. The reaction mixture is then poured onto solid sodium bicarbonate (100 mg.) and air-dried to a residue which is dissolved in methylene chloride-ether (1 part methylene chloride to 9 parts of ether) and filtered through a short Florisil column (30 g.). The eluate is evaporated to dryness and crystallized from acetone-hexane to give the compound of this example.

EXAMPLE 9

2-Methyl-5,9-Cyclo-1,11-Oxidopregnane-17α, 21-Diol-3,20-Dione 17α,21-Acetonide (A) A solution of 5,9-cyclo-1,11-oxidopregnane-17α, 21-diol-3,20-dione 17α,21-acetonide (4.0 g.) in tertiary butyl alcohol (70 ml.) is treated with sodium methoxide (0.6 g.) and diethyloxalate (1.46 g.; 1 equiv.) according to the procedure of Example 5A, to give the crude sodium enolate of 2-ethoxalyl-5,9-cyclo-1,11-oxidopregnene-17α, 21-diol-3,20-dione 17α,21-acetonide.

(B) The sodium enolate from part A of this example is treated with methyl iodide (30 ml.) and potassium carbonate (7.8 g.) in acetone (120 ml.) according to the procedure of Example 5B, and gives crude 2-methyl-2-ethoxalyl-5,9-cyclo-1,11-oxido-pregnane-17α,21-diol-3,20-dione 17α,21-acetonide.

(C) The product of part B of this example is allowed to react with sodium methoxide (600 mg.) in methanol (120 ml.) according to the procedure of Example 5C, to give 2-methyl-5,9-cyclo-1,11-oxidopregnane-17α,21-diol-3, 20-dione 17α, 21-acetonide.

EXAMPLE 10

*2-Methyl-1,4,9(11)-Pregnatriene-17α,21-Diol-3,20-Dione*

A solution of 2-methyl-5,9-cyclo-1,11-oxidopregnane-17α,21-diol-3,20-dione 17α,21-acetonide (500 mg.) in chloroform (100 ml.) is treated with dry hydrogen chloride in the manner of Example 6 for 30 minutes. The solution is evaporated in vacuo, and the residue is dissolved in acetic acid (20 ml.). The resulting solution is heated on the steam bath and water is added dropwise until the solution is turbid. The solution is cooled and filtered to give the compound of this example.

EXAMPLE 11

*2-Methyl-1,4,9(11)-Androstratriene-3,17-Dione*

To a solution of 2-methyl-1,4,9(11)-pregnatriene-17α, 21-diol-3,20-dione (1.0 g.) in 90% aqueous acetic acid (100 ml.) is added sodium bismuthate (18 g.) and the suspension is stirred at room temperature for 18 hours. The suspension is then filtered and the filtrate is diluted with water and extracted with methylene chloride. The methylene chloride extract is washed with 10% aqueous sodium bicarbonate solution, then with water, and is dried ($Na_2SO_4$) and evaporated to dryness. The residue is crystallized from acetone-hexane to give the compound of this example.

EXAMPLE 12

*2-Methyl-1,4,9(11)-Androstatrien-17β-Ol-3-One From 2-Methyl-1,4,9(11)-Androstatriene-3,17-Dione*

To a solution of 2-methyl-1,4,9(11)-androstatriene-3, 17-dione (500 mg.) in dimethylformamide (45 ml.) and water (5 ml.) is added sodium borohydride (69 mg.) and the solution is kept at room temperature for one hour. The solution is then neutralized with acetic acid, and diluted with water, and is then filtered. The residue is washed with water, dried and crystallized from acetone-hexane to give 2-methyl-1,4,9(11)-androstatrien-17β-ol-3-one.

EXAMPLE 13

*5,9-Cyclo-1,11-Oxidoandrostane-3,17-Dione From 9α-Bromo-1,4-Androstadien-11β-ol-3,17-Dione 9α-Bromo-1,4-Androstadien-11β-ol-3,17-Dione*

(A) A solution of 1,4,9(11)-androstatriene-3,17-dione (4.7 g.) in tetrahydrofuran (200 ml.) and water (65 ml.) is cooled in an ice bath, and 6.5 g. of N-bromoacetamide is added. To the stirred mixture is then added 65 ml. of N-perchloric acid (65 ml.) dropwise, and the reaction mixture is stirred for 20 hours. The reaction mixture is then treated with aqueous 10% sodium sulfite (to destroy excess N-bromoacetamide) and then diluted with water and extracted with methylene chloride. The methylene chloride extract is washed with 10% aqueous sodium bicarbonate and water, dried with magnesium sulphate and evaporated in vacuo to give the crude product. Crystallisation from acetone-hexane affords 9α-bromo-1,4-androstadien-11β-ol-3,17-dione, M.P. 171–173° dec.

(B) The compound of part A of this example (1.0 g.) is treated with chromous chloride solution in acetone exactly according to the procedure of Example 2, to give 5,9-cyclo-1,11-oxido-androstane-3,17-dione.

EXAMPLE 14

*5,9-Cyclo-1,11-Oxidoandrostane-3,17-Dione From 9α-Bromo-1,4-Androstadien-11β-ol-3,17-Dione 11β-Acetate*

(A) *9α-bromo-1,4-androstadien-11β-ol-3,17-dione 11β-acetate.*—To a stirred solution of 1,4,9(11)-androstatriene-3,17-dione (1.0 g.) in glacial acetic acid (40 ml.) containing lithium acetate (4.0 g.) is added N-bromoacetamide (540 mg.), and the mixture is stirred at room temperature for 18 hours. The reaction mixture is then poured into water, and filtered, and the residue is washed with water, dried and crystallized from acetone-hexane to give 9α-bromo-1,4-androstadien-11β-ol-3,17-dione 11β-acetate, M.P. 160–163° dec.

(B) The compound of part A of this example is subjected to the action of *Flavobacterium dehydrogenans* in the manner of Example 1 to give 5,9-cyclo-1,11-oxidoandrostane-3,17-dione.

EXAMPLE 15

*5,9-Cyclo-1,11-Oxidoandrostan-17β-ol-3-One 17β-Propionate From 5,9-Cyclo-1,11-Oxidoandrostane-3,17-Dione*

To a cooled (5°–10°) solution of 5,9-cyclo-1,11-oxidoandrostane-3,17-dione (1.0 g.) in dimethylformamide (20 ml.) and water (1.5 ml.) is added sodium borohydride (140 mg.) and the solution is left at room temperature for one hour. Water is then added and the mixture is filtered. The residue is washed with water, dried and chromatographed on a Chromosorb W partition column (toluene-propylene glycol system). The first fractions collected contain unchanged starting material, and the later fractions are combined and crystallized from acetone-hexane to give 5,9-cyclo-1,11-oxidoandrostan-17β-ol-3-one which is then dissolved in pyridine (5 ml.) and propionic anhydride (1 ml.). The solution is kept at room temperature for 18 hours, and is then diluted with water and filtered. The residue is washed with water, dried and recrystallized from acetone-hexane to give 5,9-cyclo-1,11-oxidoandrostan-17β-ol-3-one 17β-propionate.

The bacterium employed in the aforesaid process of Examples 1 and 4 is a variant which has been produced from a culture originally obtained as *Flavobacterium dehydrogenans* 7205 from the National Collection of Type Cultures, London, England. This variant is now on deposit with the American Type Culture Collection under the number 13930, and is available without restriction to any member of the public.

We claim:

1. A compound selected from the group consisting of 5,9-cyclo-1,11-oxidosteroids of the general structure:

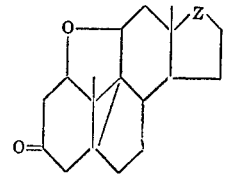

wherein Z is selected from the group consisting of

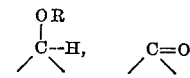

and

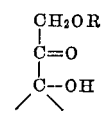

with R representing a member selected from the group consisting of H and lower alkanoyl.

2. 5,9-cyclo-1,11-oxidopregnane-17α,21-diol-3,20-dione.

3. 5,9-cyclo-1,11-oxidoandrostan-17β-ol-3-one 17β-propionate.

4. 2-methyl-5,9-cyclo-1,11-oxidoandrostan-17β-ol-3-one.

5. 5,9-cyclo-1,11-oxidopregnane-17α,21-diol-3,20-dione 17α,21-acetonide.

6. 2-methyl-5,9-cyclo-1,11-oxidopregnane-17α,21-diol-3,20-dione 17α,21-acetonide.

7. 5,9-cyclo-1,11-oxidoandrostane-3,17-dione.

8. A process for preparing a 5,9-cyclo-1,11-oxidosteroid which comprises reacting a steroid of the group consisting of 3-keto-9α-halo-11β-hydroxy-4-pregnenes, 3-keto- 9α-halo-11β-hydroxy-4-androstenes and the 1,2-dehydro analogs thereof with chromous chloride in the presence of a non-reactive organic solvent.

9. The process according to claim 8 wherein the non-reactive organic solvent employed is acetone.

References Cited in the file of this patent

UNITED STATES PATENTS

| | | |
|---|---|---|
| 2,830,935 | Shull et al. | Apr. 15, 1958 |
| 2,908,682 | Bible et al. | Oct. 13, 1959 |
| 2,910,471 | Ray et al. | Oct. 27, 1959 |
| 2,949,405 | Wettstein et al. | Aug. 16, 1960 |
| 2,955,118 | Nobile | Oct. 4, 1960 |
| 3,009,933 | Robinson | Nov. 21, 1961 |

OTHER REFERENCES

Kirk et al.: "Journal Chem. Soc.," February 1959, p. 789.